United States Patent [19]

O'Neill

[11] Patent Number: 4,973,023

[45] Date of Patent: Nov. 27, 1990

[54] LOW PROFILE SECURITY DEVICE FOR APPLIANCES

[76] Inventor: Edward L. O'Neill, 14284 Acapulco Rd., San Leandro, Calif. 94577

[21] Appl. No.: 468,636

[22] Filed: Jan. 23, 1990

[51] Int. Cl.[5] .................... F16M 13/00

[52] U.S. Cl. .................... 248/551; 248/553

[58] Field of Search .................... 248/551, 553, 552, 680, 248/681, 500, 509, 510, 506; 70/62

[56] References Cited

U.S. PATENT DOCUMENTS

| | | | |
|---|---|---|---|
| 1,851,373 | 3/1932 | Remillard | 248/509 X |
| 1,941,112 | 12/1933 | Schmansky | 248/553 |
| 2,805,035 | 9/1957 | Coombs | 248/509 X |
| 4,305,266 | 12/1981 | Lockwood | 70/58 |
| 4,881,386 | 11/1989 | Glines | 70/62 |

*Primary Examiner*—Ramon O. Ramirez

*Attorney, Agent, or Firm*—Niro,Seavone,Haller & Niro, Ltd.

[57] ABSTRACT

A low profile security device for television remote controls, televisions, and other appliances has a lower housing that encloses a leaf spring. The control module is held by an upper housing with a stud on the bottom. The stud can be locked in an opening in the lower housing by the leaf spring. A key-like member can be inserted through a hole in the side of the lower housing and a similar hole in a tab inside the lower housing. Rotation of the key-like member depresses the leaf spring, permitting the release of the stud. Another embodiment of the release mechanism uses a rod with a tapered or pointed tip that permits the rod to pass through the side hole and over the leaft spring.

20 Claims, 2 Drawing Sheets

LOW PROFILE SECURITY DEVICE FOR APPLIANCES

BACKGROUND OF THE INVENTION

This invention relates to equipment security devices, especially ones that are adapted to rotationally secure various appliances such as a hand held television remote control module to a support surface, such as an end table in a hotel room. The device is also adaptable for use with larger appliances, such as televisions.

The prior art consists primarily of a metal holder to which the remote control unit is fixed so that it cannot be dismantled. The holder, in turn, is typically attached to a fixed base by a cylinder lock that requires a traditional machined key. The cost of these devices is undesirably high, both because of the expense of the lock itself and its assembly into a finished product. In addition, the prior art devices have an undesirably high vertical profile, which facilitates a forcible removal and is also aesthetically unpleasing.

SUMMARY OF THE INVENTION

The present invention eliminates the need for a lock cylinder and machined key. Fabrication and installation costs are concomitantly reduced. Security is not sacrificed, because a lower profile is achieved, which increases the horizontal force the device can withstand.

The present invention rotatably fastens an appliance, such as a remote control television device, to a support surface. An upper housing for holding an appliance has a stud depending from it, with the stud having a shank and a head. The stud head fits inside a lower housing mounted to the support surface with a top surface and side walls. There is a first aperture in the top surface with a wide portion large enough to permit the passage of the stud head through the top surface and a second portion narrower than the stud head but wide enough to permit sliding movement and rotation of the stud shank. This allows for the assembly and disassembly of the upper and lower housings. A second aperture in one of the side walls permits releasing of the stud head from the first aperture when the stud head is positioned within the lower housing.

The invention also includes a locking means inside the lower housing for releasably securing the stud head. A biasing means urges the locking means into a securing position so that the stud is secured in the narrow portion of the first aperture for retaining the upper housing in rotatable engagement with the lower housing. The locking means preferably includes an operatively connected parallel ledge. Instead of a machined key, a disengaging means, such as a tabbed bar, slides through the aperture in the side surface and rotates to depress the ledge, which also depresses the locking means, permitting the release of the stud head from inside the lower housing, and thus disengagement of the upper and lower housings.

Various embodiments of the invention accomplish certain desirable objectives. For example, a cover plate with a top and walls and a base plate can be fabricated together so that the base plate can be attached to a surface with a double side adhesive tape. Alternatively, screws can be placed through aligned holes in the cover plate and base plate to attach the entire structure to a surface. Once the upper housing is attached, the screw holes are covered and thus inaccessible. Interlocking nubs and depressions can secure the biasing means between the cover plate and base plate with no further fastening.

The typical purpose of this device is to prevent the ordinary hotel visitor from misappropriating a remote control device for a television. The device is not designed to deter the accomplished thief who will destroy a table top by prying screws, removing thin double coated foam tape with solvents or piano wire, or duplicating the key-like member necessary to operate the present invention. Nevertheless, the low profile makes the unauthorized removal more difficult, while the force for removing the upper housing with a specially configured bar or other actuating means is trivial.

Another embodiment of the invention can be used to rotatably support a larger device, such as a television. The low profile permits the television to fit inside a cabinet without a hotel guest being aware that the television is actually locked in place and cannot be removed. This feature is particularly appealing to higher class hotels that do not wish to offend their guests by exhibiting the mistrust implied by the visible presence of a lock.

This embodiment uses a release rod with a pointed tip to depress the ledge inside the housing.

DETAILED DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DESCRIPTION OF THE PREFERRED EMBODIMENTS

Figure 1:
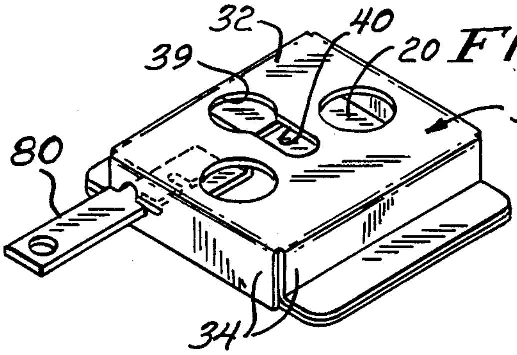
FIG. 1 is a perspective view of the base structure with the two tabbed key inserted.

The security device, generally designated as 10, has a base section comprised of a base plate 20 and cover plate 30 that form a lower housing enclosing a locking means 50 for releasably locking a stud head 73. Typically the locking means 50 is placed inside the enclosure formed by cover plate 30, with top surface 32 and side walls 34, and base plate 20, and then the cover and base plates are spot welded together. Preferably the bottom of the biasing means possesses recesses or holes that interlock by projections or nubs 22 (FIG. 5) that can be punched out of the base plate. The locking means 50 should have enough spring force so that its bottom 52 is always forced into contact with the base plate 20, even when the biasing means is simply enclosed by the base and cover plate (or support surface) but not exposed to any other forces such as those from a releasing means that unlocks the locking means.

The locking means 50 includes an upper portion of a leaf spring 54 that is constantly urged toward the inside of cover plate 30 by a biasing portion or means 51. A means for releasing stud head 73, such as ledge 56, is preferably parallel to and non-planar with the leaf spring and is connected to leaf spring 54 by connecting member 55. A key 80 depresses ledge 56. The bottom 52 of the locking means is connected to tab 58, which extends vertically between the end of ledge 56 and side 34. Tab 58 also has a slot or aperture 59 positioned above ledge 56 and is aligned with a similarly shaped aperture 42 in one of the sides 34.

Figure 2:
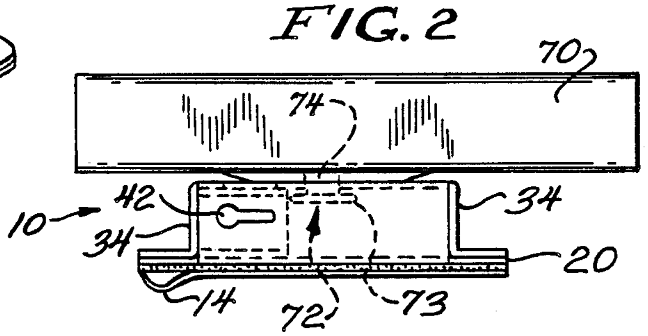
FIG. 2 is an elevation view of the side of the cover plate, depicting the appliance holder, stud head, and double-side adhesive tape.
Figure 3:
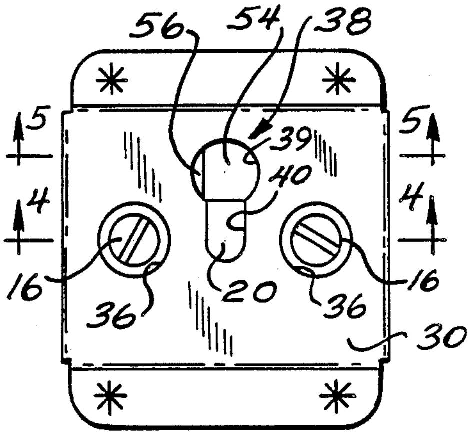
FIG. 3 is a plan view of the cover plate.

The base structure can be secured to a surface 12 in either of two ways. The first method is by the use of a double-sided adhesive foam tape 14, as shown in FIG. 2. The second method is by using screws 16 to attach base plate 20 to surface 12 (FIG. 4), whereas access to the screws can be obtained through holes 36 in cover plate 30. Once the appliance holder 70, which retains the remote control device, is secured to the base structure, access to screws 16 through holes 36 is prevented, because the holder 70 covers most or all of the top surface 32 of cover plate 30.

The appliance holder, or upper housing 70, rotatably attaches to the base section by means of a projection such as stud 72, with a head 73 and shank 74, as shown in phantom in FIG. 2. The head 73 fits through an aperture 38 in the cover plate 30 that includes a larger portion 39, preferably circular in shape. A narrower, slotted portion 40 of aperture 38 connects to the circular portion 39. The slotted portion 40 must be narrow enough so that head 73 cannot pass through it.

Figure 5:
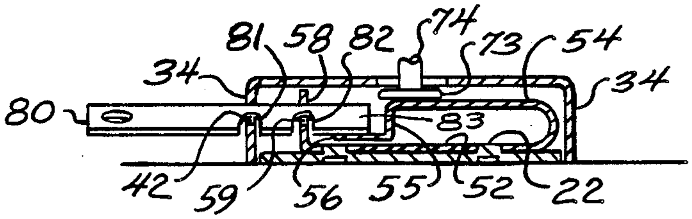
FIG. 5 is a vertical section view, 5—5, drawn through FIG. 3, depicting the biasing means in a position to release the stud head.

To secure stud head 73 within cover plate 30, the head is placed in the larger portion 39 of aperture 38 and pressed downward against leaf spring 54. When the head 73 is completely below top plate 32, as depicted in FIG. 5 (which also depicts the reverse procedure of releasing the stud head 73 by use of a key 80), stud shank 74 is slid all the way to the end of narrower slot 40. At that point the edge of head 73 should clear the edge of leaf spring 54, allowing the leaf spring to rebound upward against the inside of top 32, closing off access to the larger portion 39 by stud head 73. Thus, the shank 74 is rotatably secured in narrow slot 40 by leaf spring 54.

To release stud head 73 and thus appliance holder 70 from the base section requires the use of a disengaging means such as a bar or key 80 to move leaf spring 54. FIG. 5 depicts the preferred shape of the key, which is a flat bar, with two slots 81 and 82 and an end tab 83. The key 80 is held horizontal, as shown in phantom in FIG. 4, and inserted through aligned holes 42 and 59. Slots 81 and 82 are spaced on key 80 the same distance as holes 42 and 59, so that the narrow portion of the key, where the slots are, can rotate easily in the holes. Preferably the slots 81 and 82 and holes 42 and 59 have rounded portions that make the rotation of key 80 subject to less friction and thus easier.

Figure 4:
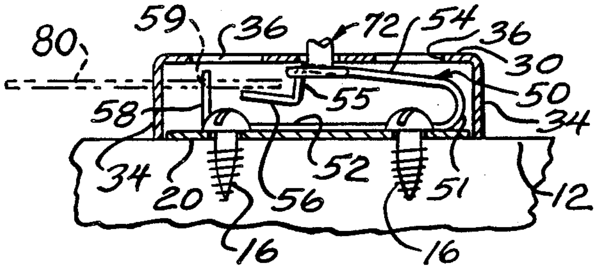
FIG. 4 is a vertical section view, 4—4, drawn through FIG. 3, depicting the biasing means securing the stud head.

As the key is rotated from the position shown in FIG. 4 to that in FIG. 5, tab 83 depresses ledge 56, actuating the release of stud head 73. This creates enough space so that stud head 73 can be slid from under narrow slot 40 to the larger opening 39. Then the stud head can be withdrawn through the top 32 so that the appliance holder 70 and the remote control device it holds can be removed.

Figure 6:
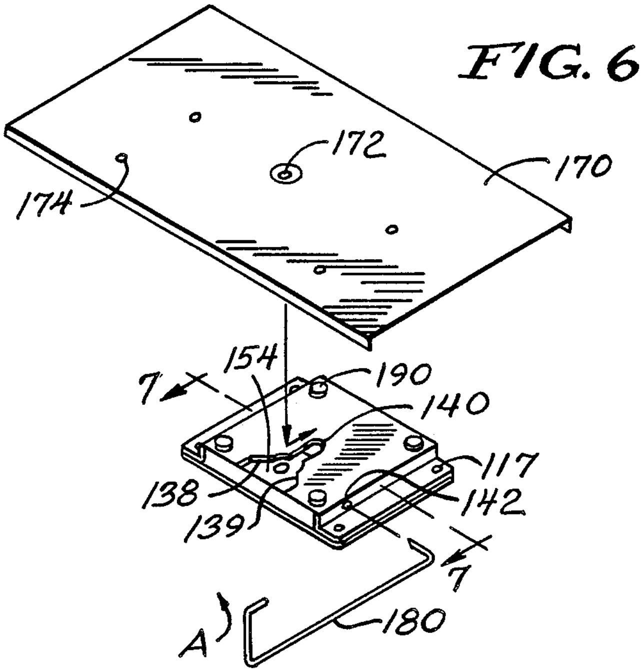
FIG. 6 is an exploded view of a device with a different platform for holding the appliance and a different release rod for actuating the spring plate.
Figure 7A:
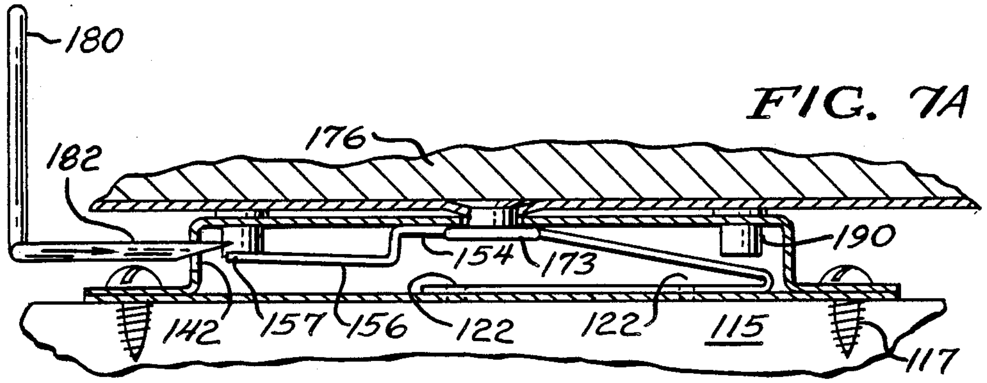
FIG. 7A is a vertical section view through FIG. 6 with the spring plate in a locking position behind the stud head.
Figure 7B:
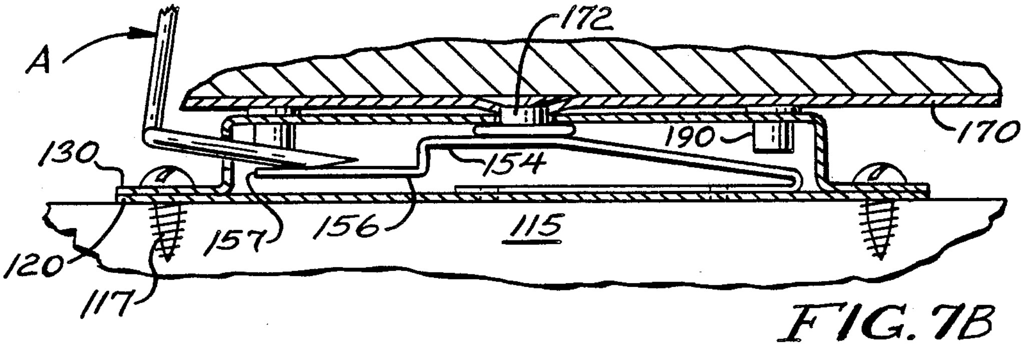
FIG. 7B is the same view as FIG. 7A except the release rod has actuated the spring plate so that the stud is free to move in the slot.

FIGS. 6, 7A, and 7B depict another embodiment of the invention. It is presently contemplated that this embodiment will be used for larger devices, such as televisions, while the other described embodiment will be used for remote control devices. The invention is not so limited, however.

This embodiment also includes a base plate 120 and cover plate 130 secured to a surface 115 by screws 117. A platform 170 attaches to cover plate 130 by means of a projection such as stud 172. Platform 170 should be large enough so that when it rotates in the slotted portion 140 of aperture 138, screws 117 are never exposed enough to allow access by an ordinary screw driver. The preferred height of cover plate 130 is on the order of 1.5 centimeters.

Platform 170 includes screw or bolt holes 174 for securing an appliance 176 from the underneath side of the platform. Rivet 172 attached to the bottom of platform 170 fits through the large portion 139 of aperture 138. The rivet 172, aperture 138, and spring plate 154 cooperate as previously described to secure and release the rivet from cover plate 130. Nubs 122 on base plate 130 can secure the spring plate as described above.

Ledge 156 is depressed by release rod 180 to unlock rivet 172 from cover plate 130. The tip 182 of rod 180 is inserted through aperture 142 and the rod is rotated in the direction of Arrow A (FIG. 7B). This depresses spring plate 154 below the head of rivet 172 so that the rivet can slide easily within aperture 138 to a point where the rivet head 173 can be removed through the large portion 139 of aperture 138.

In the prefered embodiment, tip 182, aperture 142, and ledge 156 are especially configured to perform this function. In particular, tip 182 is pointed, so that it can slide over ledge 156. Ledge 156 and aperture 142 should be sized and aligned so that if the tip 182 is not pointed, it will abut the vertical end 157 of ledge 156 and not be able to pass above ledge 156 to unlock rivet 172 and appliance platform 170.

In the preferred embodiment, nylon plugs 190 maintain a small degree of spaced relation between platform 170 and upper housing 130 to prevent friction between those two parts. The legs of release rod 180 must be sized and configured to permit the tip 182 to fit under platform 170, as well as for the particular location of the security device, e.g., inside a cabinet.

Different configurations within the scope of the present invention can easily be imagined. For example, the distance between tab 58 and side 34 can be varied during different manufacturing runs, thus allowing the locking configuration of the key to be varied. This creates the effect of having different keys without the expense of lock cylinders and machined keys. Another example would be the use of either the key 80 or release rod 180, with the appropriate corresponding spring plate to enable release, for both a small appliance holder and a large one. In that manner, only one unlocking mechanism is necessary for a hotel room with both a secured television and remote control device. Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims:

What is claimed is:

1. A security device for rotatably fastening an appliance to a support surface, comprising:
an upper housing for holding the appliance;
a projection depending from said upper housing, said on comprising a head portion and a shank portion;
a lower housing mounted to the support surface, said housing including a top surface and side walls;
a first aperture in said top surface, said aperture having a wide portion adapted to permit assembly and disassembly of said upper and lower housings and a narrow portion adapted to retain said projection and upper housing in rotatable engagement with said lower housing;
locking means disposed within said lower housing and aligned with said first aperture for releasably securing said projection in the narrow portion of said first aperture;
biasing means for urging said locking means to a position for securing said projection in the narrow portion of said first aperture;
a second aperture in one of said lower housing side walls; and
means for disengaging said locking means against the force of said biasing means to release said projection, said disengaging means being adapted to pass through said second aperture.

2. The security device of claim 1 further comprising a base plate for attaching the security device to the surface, said base plate being attachable to said lower housing to enclose said biasing means.

3. The security device of claim 1 wherein said locking means comprises a leaf spring member.

4. The security device of claim 3 wherein said locking means further comprises a ledge positioned generally parallel to and non-planar with said leaf spring.

5. The security device of claim 4 further comprising a tab generally parallel to said side surface containing said second aperture, said tab including an aperture in linearly spaced alignment to said second aperture.

6. The security device of claim 5 wherein said second aperture and said tab aperture include identically shaped portions to permit the passage of said disengaging means.

7. A security device for rotatably fastening an appliance to a support surface, comprising:
an appliance holder;
a stud attached to said holder, said holder and said stud comprising a head portion and a shank portion;
a housing for rotatably securing said holder and said stud, said housing comprising a base plate attachable to the surface, sides, and a top with an opening;
a biased bar disposed inside said housing for releasably locking said stud head in said top opening, said bar being aligned with said opening in said top whereby said stud is slidably received within a slot portion of said opening for locking said stud in rotatable assembly within said housing;
a depressible ledge operatively connected to said biased bar;

a partition disposed within said housing including a first release aperture aligned with a second release aperture in one side of said housing; and
releasing means operable from outside said housing for depressing said ledge to release said stud from said housing, said releasing means being adapted for insertion through said first and second release apertures and for rotation to depress said ledge.

8. The security device of claim 7 wherein said base plate and said biased bar are adapted to be interlocking.

9. The security device of claim 7 further comprising a double sided adhesive foam tape for attaching said base plate to the surface.

10. The security device of claim 7 further comprising aligned apertures in said top and said base plate for attaching said device to the surface with threaded fasteners, whereby said fasteners are inaccessible when said appliance holder is rotatably engaged with said cover plate.

11. A base structure adapted for receiving a stud head for attaching an appliance to a surface to prevent the removal of the appliance, comprising:
a cover plate including a top and side walls;
a base plate for attachment to the surface;
a biasing spring substantially enclosed within said cover plate and said base plate and biased against the inside of said cover plate;
an aperture in said cover plate adapted to releasably lock the stud head between said cover plate and said base plate; and
means for releasing said stud head from said cover plate comprising a first aperture in one of said side walls, a second aperture in a tab parallel to said one wall, said first and second apertures being of generally similar shape and aligned to receive a rotatable member whereby the rotation of said member moves said biasing spring away from said top to permit the release of the stud head.

12. The base structure of claim 11 wherein said means for releasing comprises an aperture in one of said side walls adapted to receive a movable release rod for depressing said biasing spring, said release rod including a tip adapted to slide through said aperture and over said biasing spring.

13. The base structure of claim 12 wherein said biasing spring further comprises a ledge engageable with said releasing rod.

14. The base structure of claim 13 wherein said releasing rod includes a tapered tip.

15. The base structure of claim 14 wherein said tip is beveled.

16. The base structure of claim 14 wherein said tip is pointed.

17. A security device for rotatably fastening an appliance to a support surface, comprising:
a means for holding the appliance;
a projection depending from said holding means, said projection comprising a head portion and a shank portion;
a housing mountable to the support surface;
a first aperture in said housing, said aperture having a wide portion adapted to permit assembly and disassembly of said holding means and said housing and a narrow portion adapted to retain said projection and said holding means in rotatable engagement with said housing;
biasing means disposed within said housing and aligned with said first aperture for releasably securing said projection in the narrow portion of said first aperture;

a second aperture in said housing; and means for disengaging said biasing means to release said projection, said disengaging means being adapted to pass through said second aperture.

18. The security device of claim 17 wherein said biasing means includes a ledge engageable with said disengaging means.

19. The security device of claim 18 wherein said ledge and said second aperture are aligned to permit said disengaging means to engage said ledge only when said disengaging means includes a tapered tip.

20. The security device of claim 19 wherein said second aperture is disposed to be accessible from underneath said holding means.

* * * * *